Jan. 4, 1949.                    W. A. RICE                    2,458,201
                    FEEDING MECHANISM FOR SEED SEPARATORS
Filed Jan. 7, 1946                                        2 Sheets-Sheet 1

Inventor
W. A. RICE
By [signature]
   Attorney

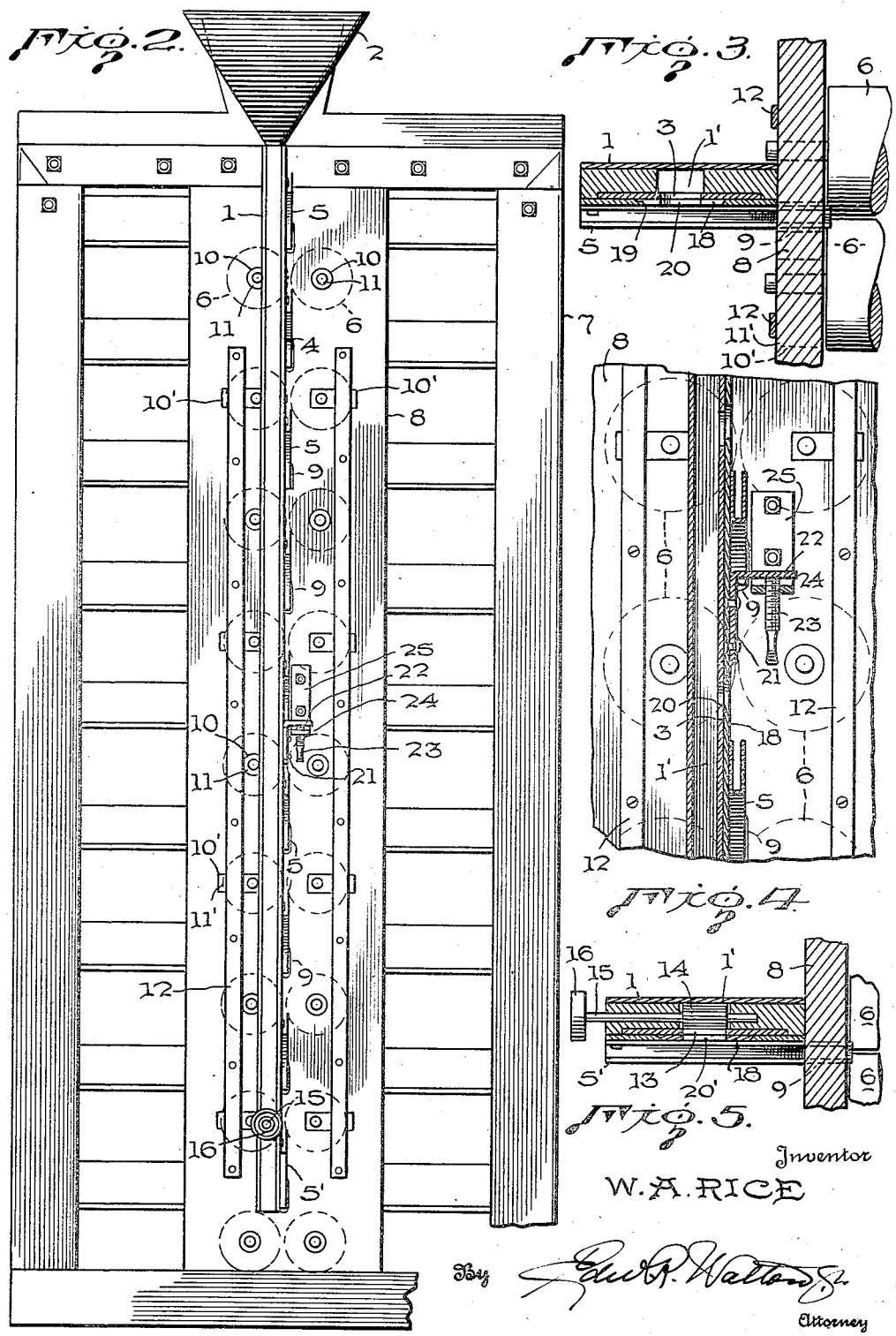

Patented Jan. 4, 1949

2,458,201

UNITED STATES PATENT OFFICE 2,458,201

FEEDING MECHANISM FOR SEED SEPARATORS

William A. Rice, Jerseyville, Ill.

Application January 7, 1946, Serial No. 639,618

4 Claims. (Cl. 209—73)

This invention relates to seed separating apparatus and, more particularly, to a feed mechanism, for such apparatus, that is adapted to accommodate large seeds such as beans and peas.

One type of seed separating apparatus with which the present invention is adapted to operate comprises a vertical series of pairs of rollers slightly tilted from the horizontal, such as shown, as one example, in my United States Patent No. 1,894,058, in which each pair of rollers are mounted in close parallel relation so as to form a trough and are rotated outwardly from this through. The rotation of the rollers causes the seed fed to said troughs to gradually slide down the incline of the troughs but rough, broken or deformed seeds are thrown out of the trough and over the sides of the rollers by the adhesion of such seeds to or caroming between the roller surfaces. The good seed is collected from the troughs at the lower ends of the rollers, and the bad seed is discharged at the bottom of the machine. Seeds are fed to each pair of rollers by a feed chute having spouts for diverting the seeds to the troughs between the rollers.

While the above described feed mechanism has been highly satisfactory with small seed, such as that of the various grasses, clovers and other legumes, it has failed to operate properly with large seeds such as those of the various beans and peas. The large seed, particularly beans, tend to pack in the chute and do not readily spill through to the spouts. Consequently, various arrangements have been adopted for forcing the beans through a chute and diverting them into the spouts. These arrangements have not been completely satisfactory, however, due to the fact that the diverting means heretofore used have created restrictions in the chute. In an effort to overcome this difficulty, movable diverting means for each spout have been employed but these have not completely surmounted the obstacle, and, furthermore, are objectionable due to the increase in parts and consequent cost, both original and in maintenance.

Having in mind the defects of the prior art feed mechanism for seed separators, it is an object of this invention to provide such a mechanism that will accommodate both large and and small seed and will freely pass them therethrough to the separator rollers, and which mechanism has a minimum of parts, particularly moving parts, has no obstruction within the chute, and yet the movement of the seed should be positive so that it will move steadily down the chute and flow uniformly into and through the spouts; thus providing a greatly simplified construction requiring less original cost and less in up-keep. Furthermore, the present invention provides a simplified arrangement for regulating the quantity of seed spilled into the spouts.

The foregoing objects, and others ancillary thereto, are accomplished broadly by providing a substantially vertical chute positioned to lie adjacent the intake or feed receiving ends of each pair of rollers and having a plurality of declined spouts mounted along one side thereof to discharge into the troughs, respectively, between said rollers, thus providing vertical columns of seed having an agitator means at the bottom of the column which agitator produces a relative movement between the seeds in said column as the latter moves down the chute and into the spouts. More specifically, the chute is provided with ports in its side wall communicating with each of the spouts, respectively, to pass seed from the interior of the chute into the trough-like spouts and is mounted on the end of a seed separating machine with the lower ends of the spouts immediately above the troughs formed by each pair of separator rollers and, in order to create a positive action in moving the seed through the chute, the agitating means, such as a toothed wheel or the like on a horizontal axis, is positioned at the bottom of the chute so as to feed the seed directly through the lowermost port into the bottom spout. By removing the seed from the bottom of the chute, a continuous movement of the seed is created in the upper part of the seed column and, as the moving seed descends through the chute, that which is adjacent to the ports spills uniformly therethrough into the spouts. In order to regulate the amount of seed that flows through the ports, an elongated shutter having apertures corresponding to the ports is slidably mounted behind the spouts in a channel in the outer surface of the side walls of the chute. By adjusting the shutter vertically, the apertures therein overlap the ports in the chute to vary the size of the passage through which the seed may escape. Any suitable means may be employed for accomplishing the vertical adjustment of the shutter.

The novel features that are considered characteristic of the invention are set forth with particularity in the appended claims. The invention itself, however, both as to its organization and its method of operation, together with additional objects and advantages thereof, will best be understood from the following description of a specific embodiment when read in conjunction with the accompanying drawings, wherein like reference characters indicate like parts throughout and in which:

Figure 2 is an end view in elevation of the present feed mechanism mounted on a seed separating machine;

Figure 3 is a cross-sectional view taken through the feed mechanism on line 3—3 in Figure 1;

Figure 4 is an enlarged view in cross-section taken on line 4—4 in Fig. 1; and

Figure 5 is a cross-sectional view of the feed mechanism taken on line 5—5 of Fig. 1.

Figure 1:
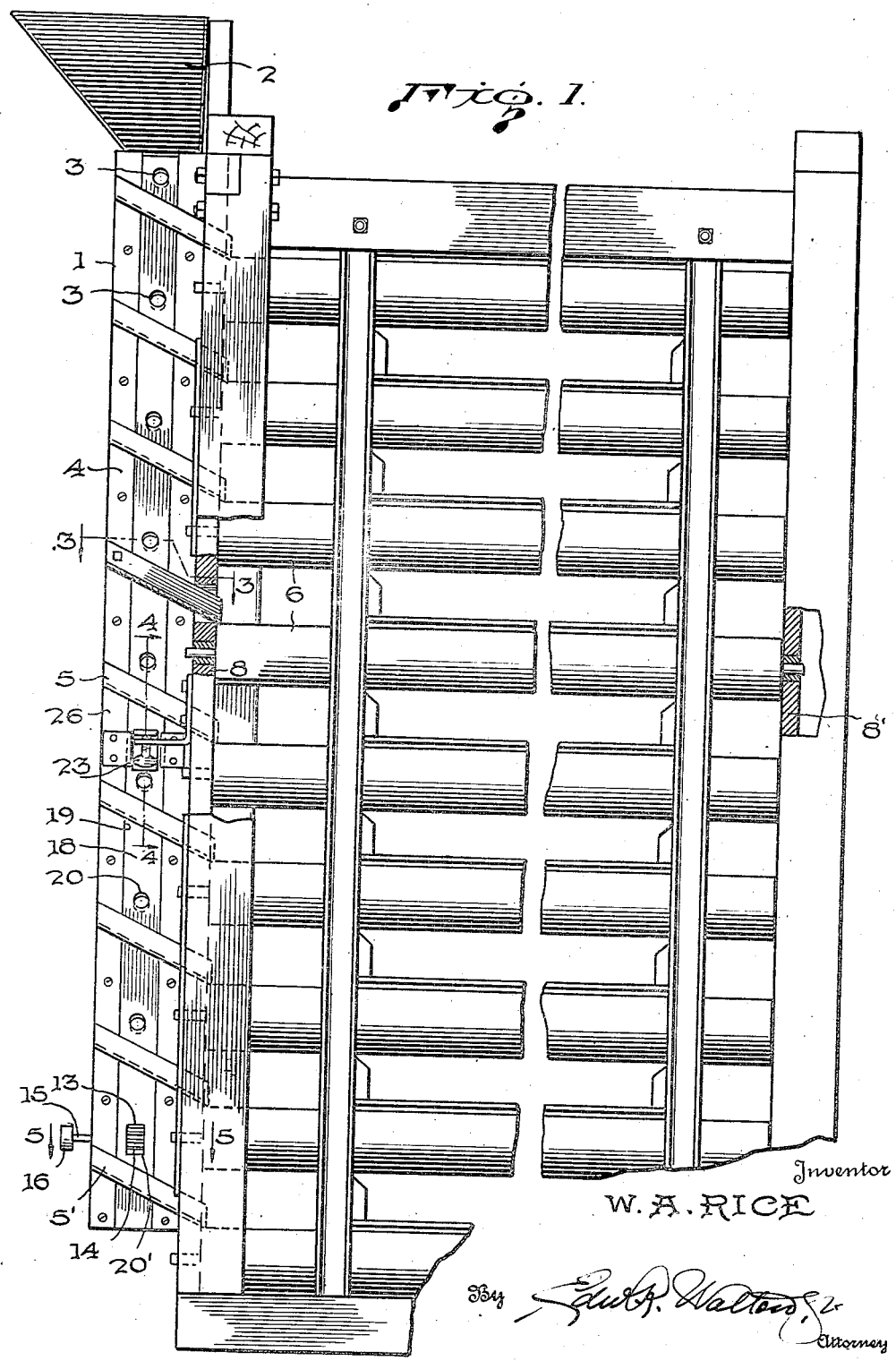
Figure 1 is a side view in elevation of a feed mechanism comprising the substances with this invention mounted at the end of a conventional seed separating machine.

A feed mechanism for a seed separating machine adapted to accommodate large seeds, such as beans, must be capable of force-feeding the seed through the mechanism and have no restrictions in the feed path. Accordingly, a preferred embodiment of the invention, referring to Fig. 1 of the drawings, is constituted by a substantially vertical column which is hollow so that the seed may gravitate therethrough. This column is in the form of an upright chute 1 having a hopper 2 at its upper end, a plurality of ports 3 positioned along one side wall 4 thereof. The passage way 1' of the chute 1, shown in Fig. 3, may be any desired size and shape but experience has proven that it operates most satisfactorily if it is about one inch square. The diameter of the ports 3 is about equal to that of the passageway 1'. A plurality of trough-like U-shaped spouts 5, one for each of said ports 3, are mounted on the side wall 4 of the chute 1 immediately below the ports and extending transversely of the ports and positioned angularly so as to spill seed from their lower ends into the troughs formed by a plurality of pairs of rollers 6. Normally, the rollers 6 are in contacting relation when small seed, such as grass or clover, is being processed so that the seed will not drop between the rollers. With large seed, such as beans, however, it is not necessary for the rollers 6 to contact, but they may be slightly spaced apart.

The pairs of rollers 6 comprise the seed separating apparatus and are well known in the aforesaid mentioned Letters Patent. The pairs of rollers 6 are positioned in a vertical series one pair above the other, within a rectangular frame 7 and are supported by upright boards 8 and 8' mounted in each end of the frame 7. The board 8 is provided with a vertical series of centrally located apertures 9 and a vertical series of horizontally positioned pairs of apertures 10 and 10'. The apertures 9 are adapted to receive the lower ends of the spouts 5, and the apertures 10 and 10' are arranged to receive bearings 11 and 11' for the pairs of rollers 6. The apertures 10 and 10' are alternately circular 10 and rectangular 10' to accommodate similarly shaped bearings 11 and 11', the rectangular bearings 11' being retained in their apertures 10' by a bar 12 that overlaps their outer ends and is attached vertically to the board 8. The board 8' is similar to board 8 except that it does not have the apertures 9 to accommodate the feed spouts 5.

As shown in Fig. 1, the frame 7 is tilted slightly so that the rollers 6 slant downwardly from the feed spouts 5. As the pairs of rollers 6 are in contact, or very slightly spaced, their adjacent upper surfaces from troughs into which the seed is fed by the spouts 5. The rollers 6 are rotated from their troughs outwardly by any suitable drive mechanism (not shown). Good seed that is clean and smooth will not adhere to the rollers 6, but imperfect, cracked or dirty seed are thrown by the surfaces of the rollers 6 or carron therebetween and be carried from the trough over the sides of the rollers 6 where it drops to the bottom of the machine. To facilitate the removal of bad seed, the rollers are preferably covered with a pile fabric as set forth in the hereinbefore mentioned patent. The rotation of the rollers 6 causes a movement of the seeds in the trough and the force of gravity causes them to migrate, during this movement, down the slope of the trough.

Immediately above the lowermost spout 5 is a port 13, that is rectangular in shape rather than circular such as the other ports 3, and through this port 13 the seeds or beans are forcibly ejected or removed. This forcible ejection of the seeds or beans may be accomplished in several ways as by, as one example, a toothed or serrated wheel 14 is positioned within the lower end of the passageway 1', as shown in Figs. 1 and 5, on a level with the port 13 so that its periphery extends to the edges of the port 13, except one—preferably the upper edge of the port 13 as shown in Fig. 1. The wheel 14 is mounted on a shaft 15 which extends transversely to the movement of seed in the chute and through the sidewalls of the chute 1 and carries a driver 16 that may be of any desired form, such as a pulley or gear, and connected with the mechanism that rotates the rollers 6. The wheel 14 may, as shown, be dimensioned to fill the cross-sectional area of the chute passage 1a to form a bottom therefor.

When seed is fed into the hopper 2, it fills the substantially vertical passageway 1' forming a column of seed, the seeds in column being moved slightly relative to one another by the rotation of the wheel 14, thus causing the seed to flow freely through all the ports 3 into the spouts 5 and forcibly feeding the seed through port 13 into the bottom spout 5'. The wheel 14 may not always be necessary when handling small seed, such as grass or clover seed, whose flow is sufficiently free to prevent packing within the chute. However, when working with large seed, such as beans which are approximately fifty times larger than grass or clover seed, the seed tends to pack and will not flow freely without forcibly feeding the seed from the bottom end of the seed column. Accordingly, it has now been found that by forcibly removing the seed from the bottom of the chute 1 only, through the medium of the wheel 14, the seed is prevented from packing at all other upper ports 3 of the vertically disposed column and a free and substantially even or uniform flow is maintained through all of the ports 3 along the length of the passageway 1'. As the seed settles a uniform amount escapes through each of the ports 3 into the spouts 5 from which it spills onto the rollers 6. By this arrangement the passageway 1' is kept open at all times and, as there are no restrictions or obstructions to divert the seed through the ports 3, packing is prevented at any place within the chute when the wheel 14 is operated.

It is desirable to have means for adjusting the size of the ports 3 in order to regulate the amount of seed that escapes through the openings 3. This is particularly advantageous in view of the fact that an opening which is sufficiently large to freely pass large seed may permit the escape of an excessive volume of smaller seed. Accordingly, an elongated shutter 18 is positioned between the ports 3 and spouts 5, lying in a channel 19 formed in the ported sidewall of the chute 1 and behind the spouts 5. The shutter 18 is provided with a plurality of apertures 20 corresponding in size and position to the ports 3 and a rectangular aperture 20' corresponding to the port 13. The shutter 18 is adapted to slide within the channel 19 so that the aperture 20 may be adjusted in overlapping relation with respect to the ports 3. By adjusting the shutter 18 vertically, the escape openings formed by the overlapping aperture 20 and ports 3, may be varied in size to accommodate the type or amounts of seed being handled, and in accordance with the speed at which the separating machine is being operated.

A very simple, but positive, arrangement for effecting the adjustment of the shutter 18, as best shown in Fig. 4, comprises a bracket 21 fixed to the shutter 18 and having an outwardly extending arm 22 that is supported by the upper end of a vertically mounted thumb screw 23 which is fixed in position. The thumb screw 23 is threaded through the arm 24 extending from a bracket 25 which is mounted on the upright board 8 of the separating machine. In order to construct the feed mechanism as a unitary member, however, it could be mounted on the stationary portion 26 of the sidewall 4 of the chute 1.

The operation of the apparatus should be readily understood in view of the foregoing description. When the seed is to be fed to the machine the escape openings formed by the apertures 20 and the ports 3 may be adjusted to the desired size by threading the thumb screw 23 through the arm 24 of the bracket 25. The screw 23 is threaded in the desired direction to either raise or lower the arm 22 of the bracket 21 which supports the shutter 18. The escape openings are adjusted in accordance with both the size of the seed which is to be handled and the speed at which the rollers 6 are to be rotated. Seed is then dumped, or otherwise delivered, into the hopper 2 which feeds it to the passageway 1' of the chute 1. As the seed descends and fills the passageway 1', the rotating wheel 14 will feed out seed through the lower port 15 and cause the overlying column of seed to move downwardly in the chute thus preventing the seed from packing or jamming in the column or at the ports 3, and, at the same time, causing the seed adjacent to and moving past the ports 3 to escape therethrough in uniform streams. As the seed is prevented from packing in the chute by the wheel 14, it will continuously descend freely through the chute and continuously spill out into the spouts 5.

Although a certain specific embodiment of the invention has been shown and described, many modifications thereof are possible. The invention, therefore, is not to be restricted except insofar as is necessitated by the prior art and by the spirit of the appended claims.

That which is claimed as new is:

1. A feed device for seeds and the like that includes an upright chute arranged to receive seed at its upper end portion and to pass seed therethrough by gravity to fill said chute, a plurality of ports in one upright wall of said chute for permitting the escape of seed therethrough by gravity only, said ports being positioned in a series longitudinally of said wall, a plurality of spouts associated with said ports to receive the seed passed by said ports and to direct the further travel of said seed by gravity, and an operable ejector means in the lower end of said chute and forming the bottom of the chute and for forcibly feed seed through the bottom port into the bottom spout, the passageway of said chute being otherwise free from restrictions or obstructions whereby the seed in the chute and overlying said ejector means will move downwardly in the chute and prevent packing therein at said upper ports and feed through said ports freely in substantially uniform streams.

2. A feed device for a seed separating machine of the type that includes a vertical series of substantially horizontal disposed seed separating devices, said feed device comprising an upright chute arranged to be positioned at one end of the machine and adapted to pass seed therethrough, a plurality of ports in one upright wall of said chute for permitting the escape of seed therethrough, said ports being positioned in a series longitudinally of said wall, a plurality of spouts associated with said ports to receive the seed passed by said ports and to direct said seed onto said seed separating devices, respectively, an operable toothed wheel rotatably mounted in the lower end of said chute on an axis transverse of the chute adjacent to the bottom port for feeding seed through the bottom port into the bottom spout, the passageway of said chute being otherwise free from restrictions or obstructions, whereby overlying seed in said chute are forcibly fed through the bottom port and caused to move downwardly in the chute and further caused to feed through the upper ports as result of said downward movement.

3. A feed device for seeds that includes an upright chute arranged to receive seed at its upper end portion and to pass said seed therethrough under influence of gravity to fill said chute, a plurality of ports in one upright wall of said chute for permitting the escape of seed therethrough by gravity only, said ports being positioned in a series longitudinally of said wall, a plurality of spouts associated with said ports to receive the seed passed by said ports and to direct the further travel of said seed, means for simultaneously varying the size of said ports to control the flow of seed therethrough, an operable ejector member in the lower end of said chute only and forming the bottom of the chute and positioned to forcibly feed seed through the bottom port into the bottom spout, the passageway of said chute being otherwise free from restrictions or obstructions, whereby all of the seed in the chute are caused to move downwardly and flow through the upper ports by gravity when said ejector member is operated.

4. A feed device for a seed separating machine of the type that includes a vertical series of pairs of substantially horizontal rollers forming troughs therebetween, which device comprises an upright chute arranged to be positioned at one end of the machine and adapted to pass seed therethrough, a plurality of ports in one upright wall of said chute for permitting the escape of seed therethrough by gravity, said ports being positioned in a spaced series longitudinally of said wall, a plurality of open-topped U-shaped spouts mounted on said chute one immediately below each and extending transversely of said ports to receive the seed passed by said ports and to direct said seed into the troughs formed by the pairs of rollers in the machine, a channel in the outer surface of said ported wall of said chute, a shutter slidably mounted in said channel, and behind said spouts, said shutter having apertures therein that correspond in size and location with said ports, means to adjust said shutter longitudinally in said channel to juxtapose its apertures relative to said ports to vary the size of the openings formed thereby, the passageway of said chute being free from restrictions, and an operable ejector rotatably mounted in the lower end of said chute on an axis transversely of the chute for feeding seed through the bottom port into the bottom spout and causing the seed in the chute and overlying the ejector to move downwardly and feed freely through the ports above the ejector in uniform streams.

WILLIAM A. RICE.

REFERENCES CITED

The following references are of record in the file of this patent:

UNITED STATES PATENTS

| Number | Name | Date |
|---|---|---|
| 1,231,158 | Hoel et al. | June 26, 1917 |
| 1,894,058 | Rice | Jan. 10, 1933 |
| 2,071,908 | Van Dyke | Feb. 23, 1937 |